United States Patent [19]

Willmore et al.

[11] 4,194,205
[45] Mar. 18, 1980

[54] R.F. POWER AND VIDEO MODULATION MONITORING CIRCUIT FOR COUNTERMEASURES SYSTEM

[75] Inventors: Robert R. Willmore, Millersville; William B. McCartney, Odenton, both of Md.

[73] Assignee: The United States of America as represented by the Secretary of the Air Force, Washington, D.C.

[21] Appl. No.: 868,969

[22] Filed: Jan. 6, 1978

[51] Int. Cl.² .................. G01S 7/38; G01S 7/40; H04K 3/00
[52] U.S. Cl. .................. 343/17.7; 343/18 E
[58] Field of Search .................. 343/17.7, 18 E

[56] References Cited
U.S. PATENT DOCUMENTS

| | | | |
|---|---|---|---|
| 2,840,810 | 6/1958 | Bailey, Jr. | 343/17.7 |
| 3,543,270 | 11/1970 | Wiley, Jr. | 343/17.7 X |
| 3,792,475 | 2/1974 | Smetana | 343/17.7 |
| 4,114,152 | 9/1978 | Wiedemann | 343/18 E X |
| 4,121,214 | 10/1978 | Marinaccio et al. | 343/18 E |
| 4,122,452 | 10/1978 | Richmond | 343/18 E |

Primary Examiner—Malcolm F. Hubler
Attorney, Agent, or Firm—Joseph E. Rusz; Willard R. Matthews

[57] ABSTRACT

The RF power and video modulation monitoring circuit of the invention provides the unique capability of monitoring the performance of a repeater/noise jammer countermeasures system when the system is operating in either the repeater or the noise jamming mode. In the repeater mode the systems noise level is measured in an unused portion of the countermeasures system frequency band to provide a monitor of system gain and antenna VSWR. In the noise mode crystal detection and threshold comparison provides an indication of RF power output. In either jamming mode the measurement of AC in the detected output provides a monitor of modulation.

3 Claims, 2 Drawing Figures

R.F. POWER AND VIDEO MODULATION MONITORING CIRCUIT FOR COUNTERMEASURES SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates to airborne countermeasures systems that operate in either repeater or noise jamming modes and in particular to monitoring circuits for such systems.

Airborne repeater/noise jammer countermeasures system at present are not provided with built in monitors of RF power or modulation to notify the operator of a system failure. The prior art approach has been to propose that RF probes followed by crystal detectors be placed within both the forward and aft antennas to determine the presence of RF power. In the noise jamming mode the system output TWT can be checked by noting that the output power has exceeded the minimum acceptable level. Also, the presence of AM modulation (but not FM modulation such as swept spot) could be detected and recognized. However, in the repeater mode the output signal power may vary from near zero when no signals are received to saturation when large signals are received. Thus, the measure of power output in the repeater mode cannot be used as a measure of the system's operational state. There currently exists the need therefor for monitoring circuits that determine the operational state of an airborne countermeasures system when operating in either the noise or repeater jamming modes. In addition, the presence of either AM or FM modulation must be detected in either jamming mode.

The present invention is directed toward providing monitoring circuits that satisfy these and other system operating requirements.

SUMMARY OF THE INVENTION

The monitoring circuits of the invention are supplied by power coupled from the countermeasures system high power 3DB output coupler. R.F. gain and antenna VSWR monitoring in the repeater mode is accomplished by band pass filtering (in an unused portion of the system frequency band) a portion of the coupled power, crystal detecting and D.C. amplifying the filter output and comparing the result in a duo threshold threshold detector. Monitoring the R.F. power in the noise jamming mode is accomplished by sending a portion of the coupled power to a second crystal detector, peak detecting its output and comparing the peak detector output in a threshold detector. Modulation in the noise jamming mode is monitored by AC coupling the crystal detector output to a peak detector and comparing the peak detector output to a DC level in a threshold detector. To accomplish modulation monitoring for the repeat mode of operation the crystal detector output is AC coupled to a D.C. amplifier the output of which is peak detected and compared in a threshold detector to a selected voltage.

It is a principal object of the invention to provide a new and improved RF power and video modulation monitoring circuit for a countermeasures system.

It is another object of the invention to provide monitoring circuits that will determine the operational state of an airborne countermeasures system when operating in either the noise or repeater jamming modes.

It is another object of the invention to provide airborne countermeasures system monitoring circuits that will detect the presence of either AM or FM modulation in either jamming mode.

These together with other objects, features and advantages of the invention will become more readily apparent from the following detailed description when taken in conjunction with the illustrative embodiment in the accompanying drawings.

DETAILED DESCRIPTION OF THE PREFERRED EMBODIMENT

Figure 1:
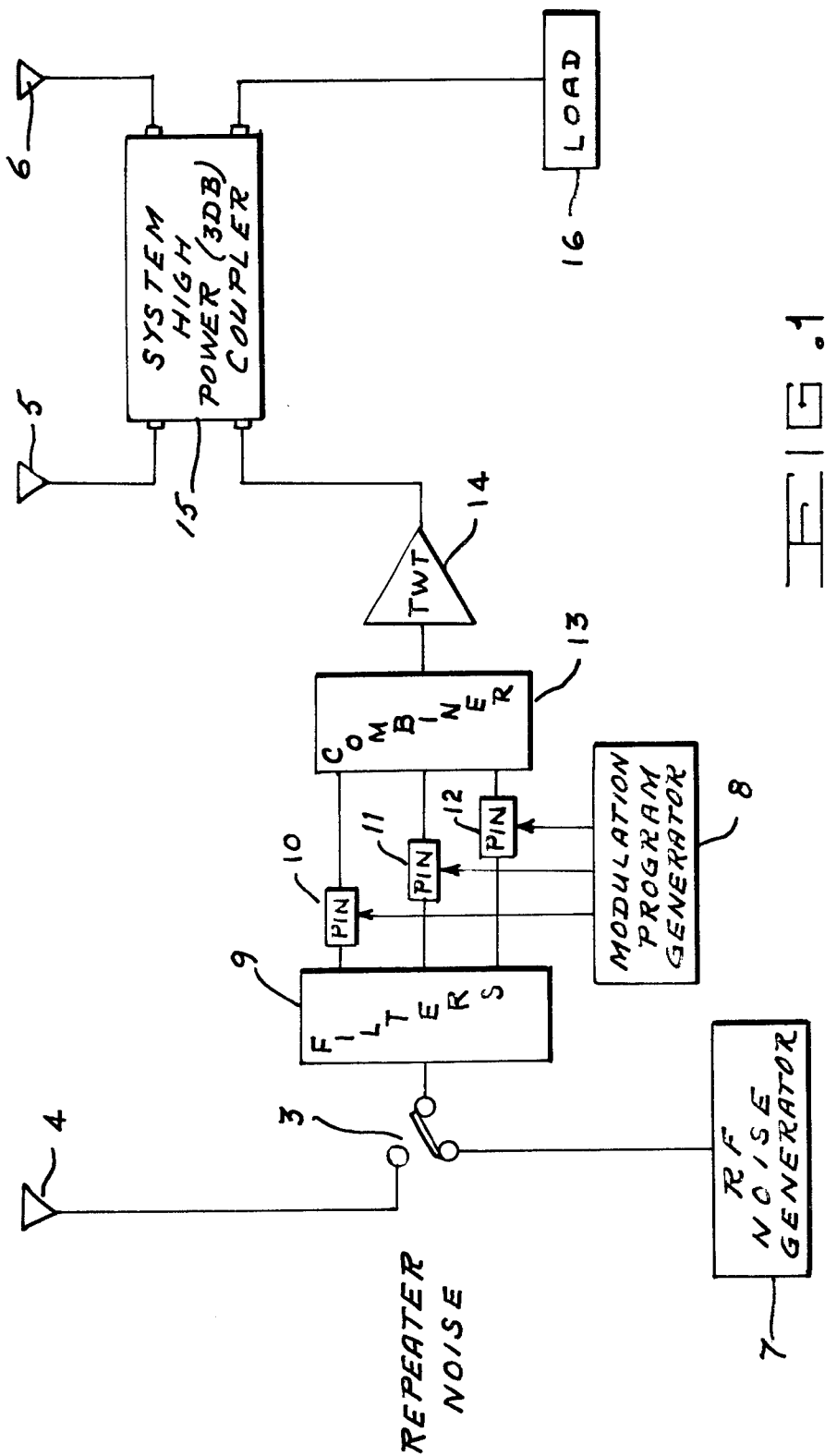
FIG. 1 is a simplified block diagram of the type of repeater/noise jammer countermeasures system comprehended by the invention.

An electronic countermeasures system of the type comprehended by the invention is illustrated in simplified block diagram form in FIG. 1. It comprises receiving antenna 4, transmitting antennas 5, 6, selector switch 3, RF noise generator 7 modulation program generator 8, PIN diodes 10, 11, 12 combiner 13, traveling wave tube 14, system high power coupler 15 and load 16. Such a system has the capability of operating either in a repeater mode or in a noise jamming mode. The choice of jamming modes along with the type of imposed modulation can be selected by the operator to optimize performance against a particular threat. In the noise jamming mode an internal noise generator produces RF noise in the desired bands. The noise jamming programs available to the operator include barrage noise, swept spot, and various barrage amplitude modulated (PIN diode modulation) noise programs. In the repeater mode of operation the received signals are first sorted in frequency and then sent to PIN diodes where they are amplitude modulated using the operator selected programs. The output from the PIN diodes (in either the noise or repeater modes of operation) is summed in a filter combiner, amplified in a TWT, and sent via a high power coupler to both the forward and aft antennas.

Figure 2:
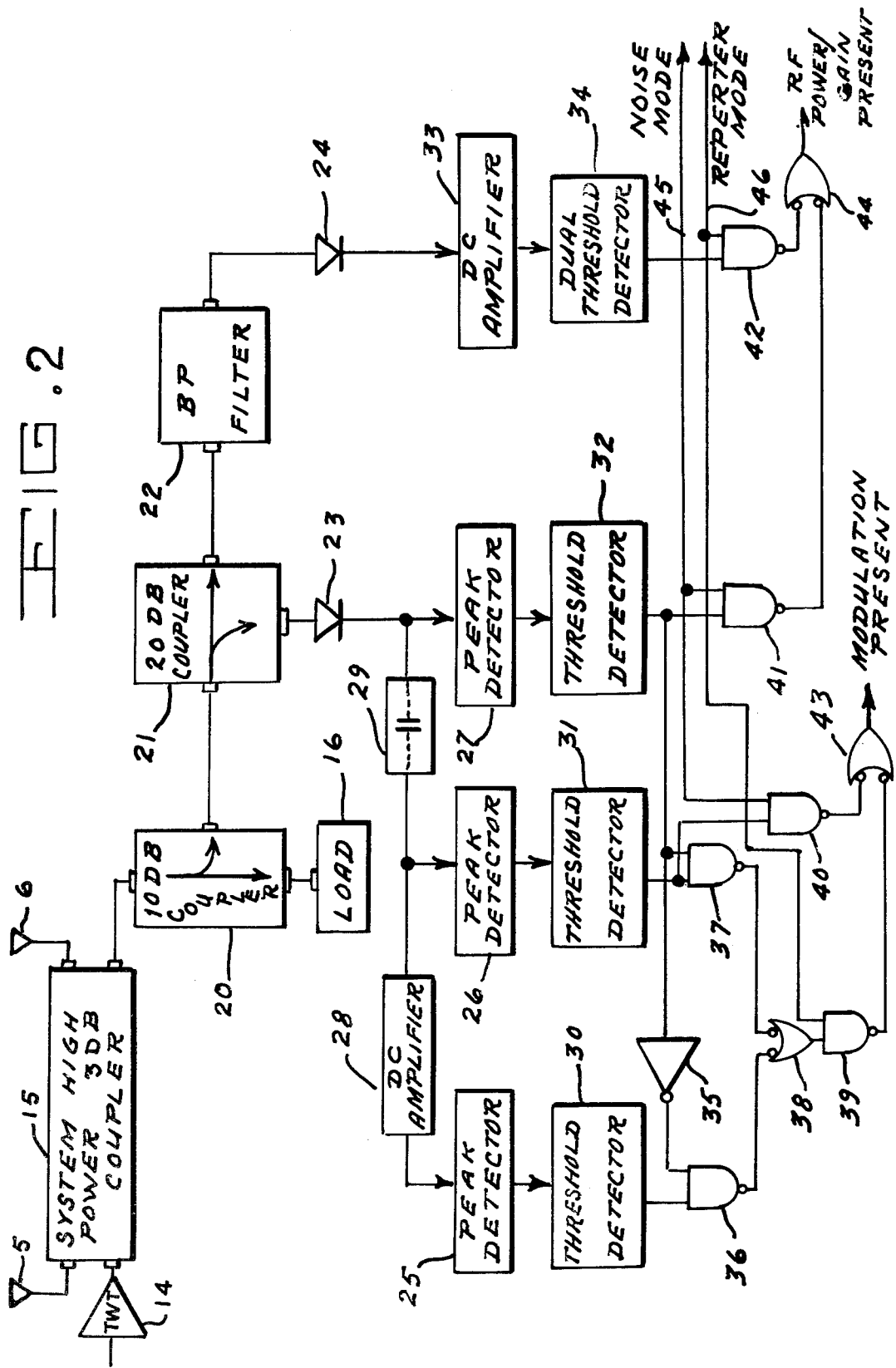
FIG. 2 is a block diagram of the RF power and video modulation monitoring circuit of the invention.

The present invention provides a unique solution to the monitoring problems outlined above. It takes advantage of an unused frequency band within the frequency range of the countermeasures system to monitor an output power due only to system noise. This permits a measurement of system gain that can be made in the repeater mode even when a signal is not received. FIG. 2 illustrates a monitoring circuit that accomplishes this.

Referring now to FIG. 2 power is coupled from system high power 3DB coupler 15 by 10DB coupler 20 and again divided by means of 20DB coupler 21. Repeater mode R.F. gain and antenna VSWR monitoring is accomplished by the circuit comprising band pass filter 22, a first crystal detector 24, a first DC amplifier 33 and a dual threshold threshold detector 34. Monitoring of RF power in the noise jamming mode is accomplished by the circuit comprising a second crystal detector 23, a first peak detector 27 and a first threshold detector 32. A circuit comprising a second crystal detector 23, A.C. coupling means 29, a second peak detector 26 and a second threshold detector 31 provides modulation detection for the noise jamming mode while the circuit comprising second crystal detector 23, A.C. coupling means 29, a second DC amplifier 28, a third peak detector 25 and a third threshold detector 30 provides monitoring of modulation for either jamming mode. Outputs of the various threshold detectors are combined for presentation by the logic circuit comprising first Nand gate 37, second Nand gate 36, third Nand gate 39, fourth Nand gate 40, fifth Nand gate 41, sixth Nand gate 42, inverter gate 35, first OR inverter gate 38, second OR inverter gate 43, and third OR inverter gate 44. Noise mode bus 45 and repeater mode bus 46 provide system operating mode information to the logic circuit.

In operation, a small portion of the power output from the loaded port of the system's high power 3DB coupler 15 is tapped off in 10DB coupler 20. The output power from the 10DB coupler consists of a combination of incident and reflected power. However, the majority of the power present in the coupler output is reflected power from the system antennas (up to 30 watts compared to approximately 5 watts of incident power). The power output from the 10DB coupler is sent to 20DB coupler 21 with the straight through output sent to bandpass filter 22 and the coupled output sent to crystal detector 23. The bandpass filter as previously stated, is centered in an unused portion of the countermeasures system frequency band. Thus, the filtered output consists of a small portion of the system's noise. The stop band attentuation of the filter has been made sufficiently high to remove any large signals present in the TWT output. The filter output is detected in crystal detector 24, amplified in a DC amplifier 23, and compared in a dual threshold circuit (ua711) 34. If the output falls within the upper and lower threshold settings the system is normal and a positive output is produced. However, if the level falls below the lower threshold (i.e., due to TWT failure) the threshold output falls indicating a fault. If the level exceeds the upper threshold (i.e., due to increase in antenna VSWR) the output will also faill indicating a failure. This information could be obtained in a separate threshold and used to turn off the system's TWT before it is damaged by the reflected power. Thus, in the repeater mode the system's gain and antennas can be checked even without an input signal.

The second output from the power divider 21 is as previously stated, sent to crystal detector 23. The output from the crystal detector can be used to form a monitor of RF power in the noise jamming mode and as a detector of modulation in either of the jamming modes. The RF power is monitored by peak detecting the crystal detector output to remove any modulation. The peak detected output is then compared in threshold detector 32. The threshold level of the threshold detector can be set low to give a coarse indication of RF power regardless of the noise jamming program or can be adjusted for fine indication with each change in the noise jamming program.

The modulation in the noise jamming mode is monitored by AC coupling the crystal detector output to peak detector 26. The peak detector converts the AC signal present in the crystal detector's output to a DC level which is compared in threshold detector 31. The threshold level will be set at a level sufficiently high to reduce false alarms to a tolerable level. When the countermeasures system operates with a barrage amplitude modulated program the amplitude modulating signal will be present in the crystal detector output. Thus, the modulation will be detected and the threshold exceeded. When the countermeasures system employs swept spot (with or without a barrage noise background) the TWT output has constant power. However, as the spot noise moves in frequency the antenna (and cables) VSWR seen by the signal changes. Thus, the reflected power from the antenna also changes. This produces an AC component in the crystal detectors output proportional to the rate of sweep of the swept spot that will exceed the threshold setting and indicate the presence of modulation. When the countermeasures system employs only barrage noise there is no modulation and therefore the threshold will not be exceeded.

In the repeater mode of operation an output signal may or may not be present. When a signal is not present the AM modulation program is still applied to the system's PIN diode modulators. The changing insertion loss of the PIN diode modulators changes the system's overall noise figure and therefore the system noise power output. Thus, the crystal detector output will contain the modulating signal even when no signal is received. A DC amplifier 28 has been provided to amplify the AC components present in the crystal detector output when operating in the repeater mode. The output from the DC amplifier is peak detected and compared in threshold circuit 30 to a selected threshold voltage. The threshold voltage is chosen so that with no system received signal the presence of modulation can still be detected. When a signal is received with sufficient amplitude the output from threshold 32 will be exceeded. This stops the observation of threshold 30 and begins the observation of threshold 31. Thus, the presence of modulation is detected for both no received signals or low level signals and for large received signals.

While the invention has been described in one presently preferred embodiment it is understood that the words which have been used are words of description rather than words of limitation and that changes within the purview of the appended claims may be made without departing from the scope and spirit of the invention in its broader aspects.

What is claimed is:

1. In an electronic countermeasures system adapted to function in either a noise jamming mode or a repeater mode and in which the system is operated in frequency bands selected from a multiplicity of frequency bands the improvement comprising a system monitoring circuit, said monitoring circuit including
a first coupling means connected to couple a portion of the power from said countermeasures system,
a second coupling means having an input port and first and second output ports, said second coupling means being connected to receive power from said first coupling means,
a band pass filter having a band pass frequency centered on the center frequency of an unused system frequency band said filter being connected to receive the output of said second output port,
first and second crystal detectors, said first crystal detector being connected to receive the output of said first output port and said second crystal detector being connected to receive the filtered output of said band pass filter,
a peak detector,
a D.C. amplifier,
a threshold detector,
a dual threshold threshold detector, first and second Nand gates,
an OR inverter gate,
a system noise jamming mode bus, and
a system repeater mode bus, said peak detector being connected to receive the output of said first crystal detector, said first mentioned threshold detector having its input connected to receive the output of said peak detector and its output connected to a first input of said first Nand gate, said DC amplifier being connected between said second crystal detector and said dual threshold threshold detector, the output of said duel threshold detector being connected to a first input of said second Nand gate, said system noise jamming mode bus being connected to a second input of said first Nand gate, said system repeater mode bus being connected to a second input of said second Nand gate, and the outputs of said first and second Nand gates being connected to first and second inputs of said OR inverter gate.

2. In an electronic countermeasures system adapted to function in either a noise jamming mode or a repeater mode and in which the system is operated in frequency bands selected from a multiplicity of frequency bands the improvement comprising a system monitoring circuit including
a first coupling means connected to couple a portion of the power from said countermeasures system,
a first crystal detector connected to receive output power from said coupling means,
first, second and third peak detectors,
an AC coupling means,
a DC amplifier,
first, second and third threshold detectors,
first, second, third and fourth Nand gates,
an inverter gate,
first and second OR inverter gates,
a system noise jamming mode bus, and
a system repeater mode bus, the output of said crystal detector being connected directly to said first peak detector, to said second peak detector through said AC coupling means, and to said third peak detector through said AC coupling means and said D.C. amplifier, the output of said first peak detector being connected to the input of said first threshold detector, the output of said second peak detector being connected to the input of said second threshold detctor, the output of said third peak detector being connected to the input of said third threshold detector, the output of said third threshold detector being connected to a first input of said second Nand gate, the output of said second threshold detector being connected to a first input of said first Nand gate and to a first input of said fourth Nand gate, the output of said first threshold detector being connected to a second input of said first Nand gate and to a second input of said second Nand gate and to a second input of said second Nand gate through said inverter gate, the outputs of said first and second Nand gates being connected to first and second inputs of said first OR inverter gate, the output of said first OR inverter gate being connected to a first input of said third Nand gate, said system repeater mode bus being connected to a second input of said third Nand gate, said system noise jamming mode bus being connected to a second input and said fourth Nand gate, and the outputs of said third and fourth Nand gates being connected to first and second inputs of said second OR inverter gates.

3. In an electronic countermeasures system adapted to function in either a noise jamming mode or a repeater mode and in which the system is operated in frequency bands selected from a multiplicity of frequency bands the improvement comprising a system monitoring circuit, said monitoring circuit including
a coupling means connected to couple a portion of the power from said countermeasures system,
a crystal detector connected to receive the output of said coupling means,
a peak detector connected to receive the output of said crystal detector,
a threshold detector connected to receive the output of said peak detector,
a second coupling means having an input port and first and second output ports said second coupling means being connected to receive power from said first coupling means,
a band pass filter having a band pass frequency centered on the center frequency of an unused system frequency band, said filter being connected to receive the output of said second output port,
a second crystal detector, said first mentioned crystal detector being connected to receive the output of said first output port and said second crystal detector being connected to receive the filtered output of said band pass filter,
a second DC amplifier,
a dual threshold threshold detector,
fifth and sixth Nand gates, and a
third OR inverter gate, the output of said first threshold detector being connected to a first input of said fifth Nand gate, said second DC amplifier being connected between said second crystal detector and said dual threshold threshold detector, the output of said dual threshold threshold detector being connected to a first input of said sixth Nand gate, said system noise jamming mode bus being connected to a second input of said fifth Nand gate, said system repeater mode bus being connected to a second input of said sixth Nand gate, and the output of said fifth and sixth Nand gates being connected to first and second inputs of said third OR inverter gate.

* * * * *